Aug. 4, 1931. H. HUEBER ET AL 1,817,563
AUTOMATIC WINDSHIELD CLEANER
Filed Oct. 14, 1925 2 Sheets-Sheet 2
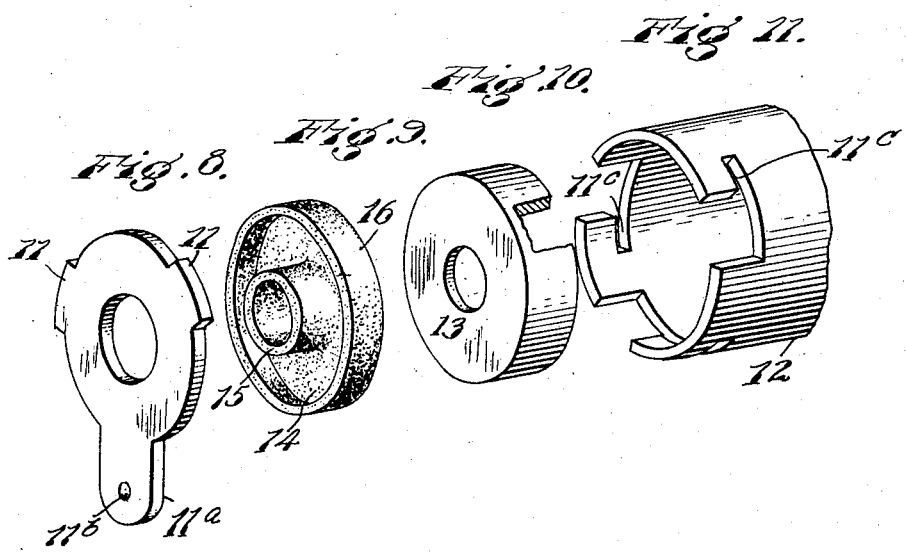
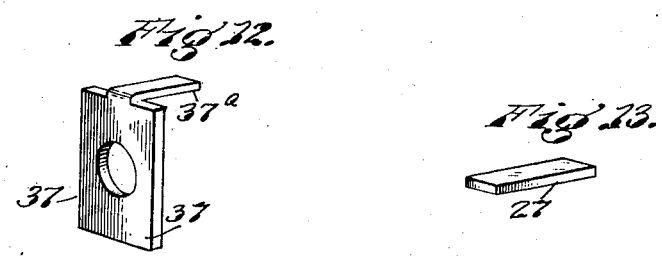

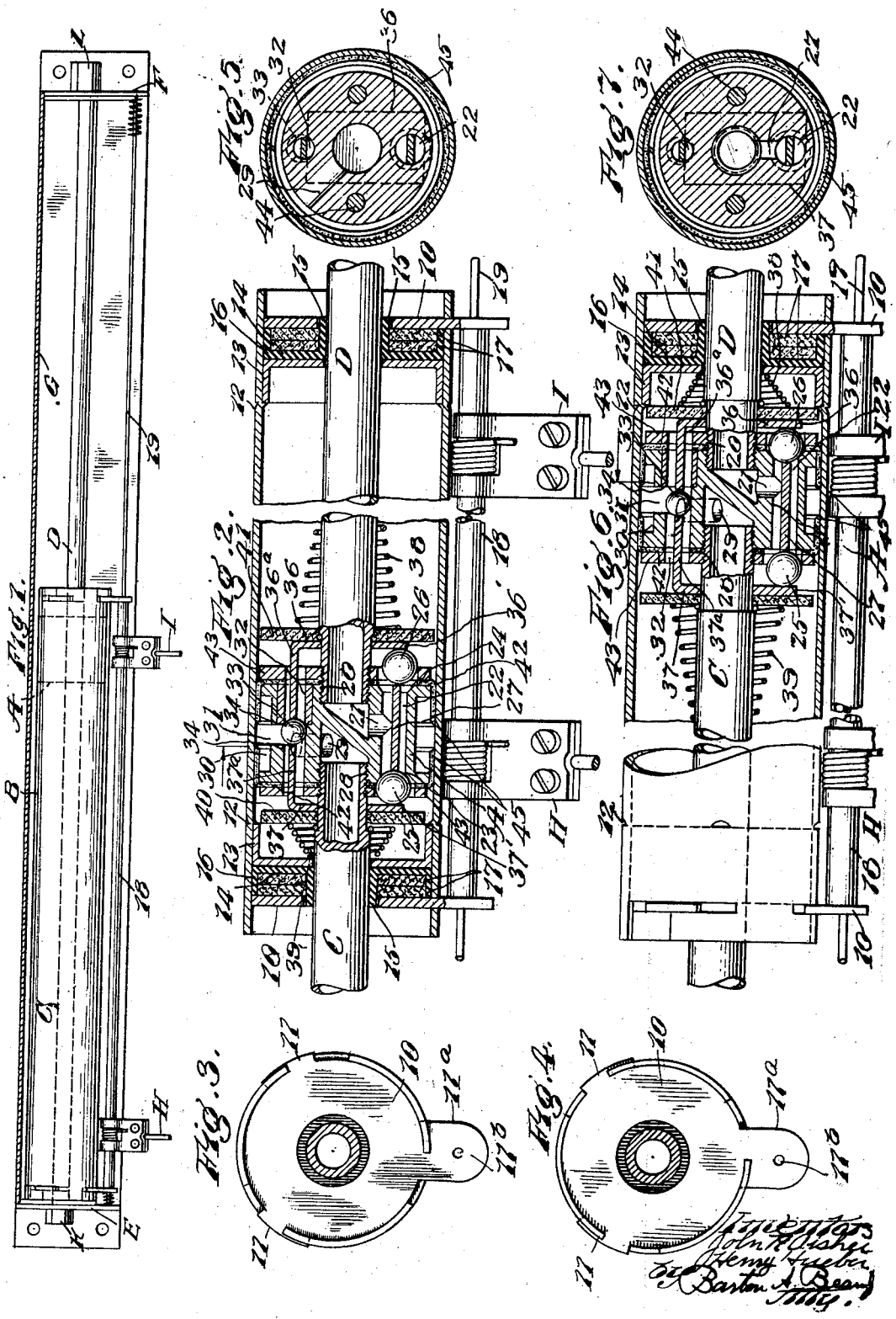

Patented Aug. 4, 1931

1,817,563

UNITED STATES PATENT OFFICE

HENRY HUEBER AND JOHN R. OISHEI, OF BUFFALO, NEW YORK, ASSIGNORS TO TRICO PRODUCTS CORPORATION, OF BUFFALO, NEW YORK

AUTOMATIC WINDSHIELD CLEANER

Application filed October 14, 1925. Serial No. 62,437.

This invention relates to fluid pressure motors of the type adapted to operate windshield cleaners, such as shown in the concurrently filed application of Henry Hueber, Serial No. 62,435.

Heretofore in motors of this type the construction of such motors has involved intricate and expensive machining operations and the like and certain other disadvantages have been present such as leakage of the operating fluid past the piston of the device or through the ends of the device into the piston chamber. In such cases elaborate packings have been provided in an endeavor to tightly pack the devices against leakage but such has in many cases resulted in undue friction which impairs the efficiency of the device. Further difficulties have been present in the reversing valve structures requiring accurate machining of the valves and a positive seating on double valve seats. As the devices wear, the proper spacing between these parts is often destroyed with the result of leakage or improper functioning.

The objects of the present invention are to provide a fluid pressure motor which will operate on very low pressures; also to provide a fluid pressure motor consisting of the minimum of simply and inexpensively constructed parts; also to provide a fluid pressure motor consisting of few parts which may be very readily assembled without the use of presses, fitting devices or complicated tools; also to provide a fluid pressure motor which may be readily dismantled with the use of ordinary tools.

In the accompanying drawings:

Fig. 1 is a sectional elevation of a motor embodying the invention.

Fig. 2 is a section through the cylinder and piston of the motor, on an enlarged scale.

Fig. 3 is a section on line 3—3, Fig. 2.

Fig. 4 is a section on line 4—4, Fig. 2.

Fig. 5 is a section on line 5—5, Fig 2 with the wiper supporting means omitted.

Fig. 6 is a section similar to Fig. 2 but showing the valves in a different position.

Fig. 7 is a section on line 7—7, Fig. 6 with the wiper supporting means omitted.

Figs. 8, 9, and 10 are perspective views of parts of the end assembly of the cylinder.

Fig. 11 is a perspective view of an end portion of the cylinder.

Fig. 12 is a perspective view of one of the valve moving plates.

Fig. 13 is a perspective view of the ball valve spacer.

The device of this invention, generally stated, includes a fluid pressure cylinder and a piston, which is preferably adapted to operate on low pressures, as for example, atmospheric air pressure, as is utilized when the device is placed in communication with the intake manifold of an automobile engine, one of which parts is movable relatively to the other, and means for transmitting the motion of the movable part to a device or part to be operated, together with valves for automatically reversing the direction of movement of the movable part.

In the form of the invention illustrated, there is provided a fixed or stationary piston, generally designated as A, which is enclosed in a movable cylinder B. The piston A is secured to a pair of pipes or conduits C and D, in the form of the invention shown the conduit C is open at its outer end to the atmosphere and the conduit D is adapted to be open to a source of reduced pressure, such for example as the intake manifold of an automobile engine, the cylinder being provided with end members which engage the respective tubes C and D so that the cylinder is supported on the piston and on the tubes. The outer ends of the tubes C and D are preferably mounted in substantially rigid end members or brackets E and F respectively or a housing or support G, so that the cylinder is reciprocable between the end members or brackets E and F of the housing or support, the piston being provided with automatic valves for controlling the admission of air or operating fluid from the tube C to the ends of the cylinder, and the exhaust or withdrawal of air or fluid from the ends of the cylinder through the tube D.

The cylinder B is preferably constructed of a section of tubing of any desired size or weight and the invention lends itself readily to the use of a section of standard tubing for the cylinder. As illustrated, the ends of the cylinders are each provided with a detachable end or closure member 10. These end or closure members are preferably of substantially circular outline or disk-like form and are provided with one or more locking lugs or tongues 11, the end pieces being provided centrally with an aperture or opening for permitting the passage of one of the tubes C or D therethrough. These end pieces may be readily stamped at one operation out of suitable sheet metal. Certain of the locking lugs or tongues on the end pieces are preferably elongated to provide brackets or ear portions 11a for a purpose to be hereinafter referred to. In order to receive the end pieces, the ends of the cylinder are provided with an appropriate number of slots extending circumferentially of the cylinder, transversely to its axis as at 11C. These slots have openings at the end edges of the cylinder of sufficient size to receive the locking lugs on the end pieces and as illustrated in Fig. 3, the end pieces are readily connected with the cylinder by placing the end pieces with their locking lugs in the recesses or slots in the end of the cylinder and partially rotating the end pieces or the cylinder, whereupon the end pieces are detachably locked to the ends of the cylinder. The ends of the cylinder are packed against leakage preferably in the following manner. Adjacent the ends of the cylinder the cylinder walls are pressed or scored, or punched, so as to provide suitable inwardly projecting flanges or protuberances 12. Cooperating with the flanges or protuberances 12 at each end of the cylinder is a cup member 13 provided with an axial opening to receive the respective tubes C and D with side flanges the edges of which engage the flanges or protuberances 12 so that the cup member may not move inwardly of the cylinder. These cup members cooperate with the end pieces to hold the cylinder packing in place. The cylinder packing is preferably an annular channeled leather and comprises a body portion 14 which is formed with an axial opening to receive the tube C or D and an inner collar 15 substantially concentric with the tube C or D, together with an outer collar substantially concentric with the inner collar and spaced therefrom, as at 16. The free edges of the collars 15 and 16 face outwardly towards the ends of the cylinder and are preferably flexible and free to move to a slight extent against a pair of contained felt washers 17, the body portion of the leather packing member being held in place by suitable means, as by being interposed between the member 13 and the end piece 10. The cylinder ends so far described may be readily assembled by dropping the metal cup member 13 into the end of the cylinder over the tube D, for example, referring to Fig. 2, by dropping the cupped leather washer into place, together with the felt washers 17, and then by inserting the end piece 10 in place and partially rotating it, as described hereinabove, whereupon the cylinder end is assembled.

The parts or devices to be operated by the motor, in the form of the invention illustrated herein, are carried or moved by the cylinder, being mounted thereon by suitable means or in suitable manner. In the form shown, the parts to be operated are windshield wiper carrying rods H and I. These wiper carriers may, as shown, be mounted on a sleeve 18 which is carried by the end pieces 10 of the cylinder. For purposes of ready assembly, the sleeve 18 is mounted between the end pieces 10, with its ends in contact with the portions 11a of the end pieces 10, and is slidable on a wire or rod 19, the ends of this wire or rod 19 being secured in the end brackets or members E and F of the support or housing. It will thus be seen that in the preferred form illustrated, the removable end pieces of the cylinder not only serve the purpose of closing the end of the cylinder and maintaining the packing in place, but also serve as carriers for the devices to be operated.

The outer ends of the tubes C and D are connected to the brackets E and F of the support or housing in suitable manner. As shown, these ends of the tubes are provided with screw threads which are engaged by the nuts K and L so that the tubes are held rigidly in place in the housing. In assembling the device so far described, when the end pieces of the cylinder have been placed in position, the sleeve 18 with its wiper carriers H and I is placed in position between the portions 11a of the cylinder ends and the wire or rod 19 then inserted through one end of the bracket E or F, through the holes 11b in the end pieces 10 and through the sleeve 18. The ends of the wire or rod 19 are then secured to the brackets E and F in suitable manner so as to place the wire or rod 19 under considerable tension. This makes a rigid guide for the sleeve 18.

The slots in the ends of the cylinder which are engaged by the lugs 11 of the cylinder end pieces, preferably open in opposite directions (as shown in Figs. 3 and 4) so that when the end pieces are put in position on the ends of the cylinder to detachably lock them, one end piece is rotated in one direction and the other end piece is partially rotated in an opposite direction. By reason of the wire or rod 19 projecting through the holes 11b in these end pieces, when this wire or rod is in position partial rotation of the end pieces or of the cylinder is prevented due to the reverse direction insertion and removal of the end pieces.

In the form of the invention shown, the valves or means for controlling the admission of the operating fluid to the ends of the cylinder are constructed as follows:

The air exhaust tube or conduit D is provided with a screw threaded end 20 engaging a threaded aperture in the piston A and the inner end of this tube or conduit D is in communication through a port 21 with a chamber or port 22 which extends through the piston from one side thereof to the other. As shown in Figs. 5 and 7, this port or chamber 22 may be of cylindrical form. The port 22 is provided at its opposite ends with valve seats 23 and 24 adapted to be engaged by ball valves 25 and 26. It has been found desirable to use ball valves in constructions such as this where the pressures to operate the motor may be relatively low, as they are self centering being free to rotate and keep the valve seats from becoming distorted and automatically adjust themselves to minor inequalities in the valve seats which might otherwise cause leakage. Further, the provision of the loose ball valves with their spacer and actuating plates take care of any wear on the spacers, actuating plates, or valve seats by reason of the fact that if the valve seats are positively moved to approximate seating position, the currents of fluid through the valved passages are so directed as to complete the closure of the valves. For example in the positions of the valves shown in Fig. 2, where the valves have just changed so that air is about to be withdrawn from the right hand end of the cylinder past ball 26, if the finger 37a of valve actuating plate 37 is worn so that it does not shove ball 33 completely home on its seat 34, the movement of air past ball 33 from chamber 30 will force the ball home on its seat as air is being withdrawn behind that seat. These ball valves 25 and 26 are held in spaced relation by means of a spacing member 27 which is free to move in the port 22 and loosely connects the balls 25 and 26 of this valve structure.

The tube C is likewise provided with a threaded end 28 engaging a suitable threaded recess in the piston and communicates through means of a port 29 with a chamber 30. From the chamber 30 which is preferably adjacent the periphery of the piston a port 31 extends to a passage 32, which passage extends from one side of the piston to the other, and as shown in Figs. 5 and 7, is preferably in the form of a cylindrical port or passage. At its opposite ends the port or passage 32 is open to opposite ends of the cylinder and the admission of operating fluid to this port or passage is controlled by a ball valve 33 which alternately engages the valve seats 34 and 35 controlling communication between the passage 31 and the opposite ends of passage 32. The valve heads or balls 25, 26 and 33 are positively moved by means of the plate members 36 and 37. A pair of these plate members is provided, each plate member having a body portion 36′, 37′ with an aperture whereby it is slidable on the end of the tube C or D, and an angularly extending finger or portion 36a, 37a, which is adapted to engage the ball valve 33. The lower end of the body portions engage the ball valves 25 and/or 26. The plate members 36 and 37 are moved, preferably by means of springs 38 and 39 which are engaged by the ends of the cylinder or by the cups 13 at the ends of the cylinder as the cylinder end nears the piston during its stroke and for purposes of preventing noise, buffing washers 40 and 41 are interposed between the springs and between the plate members 36 and 37. The action of these springs 38 and 39 is to quickly reverse the valves. As the end of the cylinder comes in contact with the adjacent spring 38 or 39 and continues to travel toward the piston, it compresses the spring until enough potential energy is built up in the spring to overcome the resistance to movement of the valves from their seats. The spring then quickly snaps the valves to the opposite position, reversing movement of the cylinder.

As illustrated in Figs. 2 and 6, the piston may be packed in the following described manner. 42 designates a pair of substantially cupped packing members of leather or other suitable material which may be secured to the piston by suitable means, as for example the removable plates 43 secured to the body of the piston by screws or attaching devices 44 so that the bodies of the packing members are clamped between the movable plates and the body of the piston. The piston packing members are provided with free edges or flanges 45 which extend toward one another along a portion of the inner wall of the cylinder in contact therewith and preferably across a portion of chamber 30 so that atmospheric air or other operating fluid being admitted to the piston tends to hold the sealing edges of the packing members in proper contact with the cylinder walls. This is accentuated by the fact that the pressures in the cylinder beyond the ends of the piston is at all times less than the pressure in chamber 30 or, for example when operating on atmospheric air, air is being withdrawn from one end of the cylinder resulting in "suction" or a pressure less than atmospheric in that end of the cylinder. This acting with the atmospheric pressure in chamber 30 tends to draw the free edge of the packing member toward the space which is being evacuated resulting in the edge of the packing member effectively contacting with the inner wall of the cylinder to seal it and the greater the differential in pressures the greater the seal.

As illustrated in Fig. 2, the cylinder has been traveling in a right-hand direction and the left hand end of the cylinder has approached the fixed piston, compressing the spring 39, whereupon the plate member 37 has been moved, forcing the ball valve 33 against the seat 34 and forcing the ball 25 against the seat 23 and removing the ball 26 from the seat 24. In these positions of the valves, atmospheric air entering through tube C and passing through port 29 to chamber 30, passes through port 31, past valve seat 35 into the left hand end of the cylinder at the left hand side of the piston. At the same time air is withdrawn from the right hand end of the cylinder, past ball valve 26 and valve seat 24 through port 21 and through the exhaust tube D. The cylinder then moves to the left until the right hand end of the cylinder compresses spring 38, as shown in Fig. 6, whereupon the valves are shifted to the positions shown in that figure, and thereupon the application of atmospheric air and the exhausting influence is reversed and in the position of the valves shown in Fig. 6, atmospheric air will be admitted through tube C, port 29, chamber 30, port 31, passage 32 to the right hand end of the cylinder at the right hand side of the piston and the air will be withdrawn through tube D, port 21, passage 22, past valve 25 and valve seat 23 from the left hand end of the cylinder. The cylinder thereupon starts on its stroke towards the right. It will be seen that as long as an air exhausting influence is applied through the tube D, the operation or movement of the cylinder will be automatic, moving first in one direction and then in the other.

Having described the operation of the valves, the operation of the packing members at the ends of the cylinder may now be more clearly understood. With the valves positioned as in Fig. 2, so that air is being withdrawn from the right hand side of the cylinder at the right hand side of the piston it will be understood that there is a lowered pressure condition in this right hand side of the cylinder, that is during the process of withdrawal the air in that side will be less than atmospheric pressure. At the same time at the outside of the cylinder the free normal atmospheric pressure is being applied so that there is a tendency to draw the ends of the collars 15 and 16 of the packing leathers inwardly of the cylinder. This results in these ends of the collars of the packing leathers bearing tightly upon the inner side of the cylinder wall in the case of collar 16 and upon the tube D in the case of collar 15, with the result that there is no leakage of atmospheric air from outside of the cylinder into the chamber being evacuated which would interfere with or impair the efficiency of the device. It will be understood that as this packing leather becomes worn it has greater movement and greater flexibility and that its sealing action is practically automatic, the edges of the leather being moved by the forces operating within and without the cylinder. In cases where the evacuation of the cylinder is not very rapid and there is no great lowering of pressure within that end of the cylinder, as where the vacuum available for operation is very small, the edges of the leather collars are not forced against the cylinder walls or against the tube so tightly, therefore there is less friction from these packing leathers than there is when there is a large amount of power available and the device is constructed so as to operate under very low pressures and still provide an effective seal. By reason of the form and arrangement of these packing leathers in case greater power is applied more friction at this point can be absorbed and this packing will still provide against leakage, under such greater power influences. Referring to the position of the valves in Fig. 6, it will be noted that atmospheric air is being admitted to the right hand side of the cylinder at the right hand side of the piston through the tube C, port 29, chamber 30, port 31, and passage 32. So we have a condition at the right hand side of the cylinder where atmospheric pressure is being built up at the inner faces of the packing leathers and the normal free atmospheric pressure is being applied at the outside. In such condition there is no leakage past the packing leathers for the reason that the pressure being applied within the right hand end of the cylinder could not slip out along the tube D or along the inner side of the cylinder walls past the collars of the packing for the reason that it is opposed on the outside of the cylinder by the free atmospheric pressure which is as great, if not greater, than the pressure being applied within the cylinder. The valve mechanism above set forth forms the subject matter of our co-pending application filed May 25, 1927, Serial No. 194,037.

We claim as our invention:—

1. In a cylinder construction for fluid pressure motors, a cylinder having circumferentially arranged slots opening through its ends, disc-like end closure pieces for said cylinder, said end pieces having lugs engaging the slotted portions of said cylinder to be retained therein, and packing parts cooperating with said end pieces to close the ends of the cylinder.

2. A cylinder having an internal shoulder adjacent one end, a supporting member held in the end of the cylinder by said shoulder against inward movement, a cup packing member seated against the supporting member and cupped away therefrom, said packing member having an axially disposed collar extending away from the supporting member, said cylinder having peripheral slots extending circumferentially in a plane substantially parallel to the adjacent edge of the cup packing member, and a retaining member axially positionable within the cylinder and having parts engaging in the peripheral slots of the cylinder for holding said retaining member against displacement and against movement toward the packing member.

3. In a cylinder construction for a fluid pressure motor, a cylinder consisting of a section of tube, said tube having circumferentially extending slots adjacent and opening through the ends thereof, a pair of end closure members for said tube constituting the ends of the cylinder, said end closure members having circumferential lugs adapted to engage in the slots of said tube, whereby the lugs of said end closure members may be engaged in the slots of said tube and partially rotated to be detachably locked to the ends of said tube, and means for securing said end members against partial rotation relative to said tube to prevent said end members from becoming disconnected from said tube.

4. In a cylinder construction for a fluid pressure motor, a cylinder consisting of a section of tube, said tube having circumferentially extending slots adjacent and opening through the ends thereof, a pair of end closure members for said tube constituting the ends of the cylinder, said end closure members having circumferential lugs adapted to engage in the slots of said tube, whereby the lugs of said end closure members may be engaged in the slots of said tube and partially rotated to be detachably locked to the ends of said tube, and means connecting said end closure members whereby said end members are secured against relative movement one to the other.

5. In a cylinder construction for a fluid pressure motor, a cylinder consisting of a section of tube, said tube having circumferentially extending slots adjacent each end thereof, a pair of end closure members for said tube constituting the ends of the cylinder, said end closure members fitting within the tube and having circumferential lugs adapted to engage in the slots of said tube, whereby the lugs of said end closure members may be engaged in the slots of said tube and partially rotated to be detachably locked to the ends of said tube, the slots in the respective ends of said tube opening in opposite directions, and means connecting said end members for holding them against relative rotary, displacing movement.

6. In a cylinder construction for a fluid pressure motor, a cylinder consisting of a section of tube, said tube having circumferentially extending slots adjacent the ends thereof, each slot opening at one of its ends through the adjacent end of the tube with the slots at the opposite ends of the tubes opening therethrough from opposite ends of the respective slots, a pair of end closure members for said tube constituting the ends of the cylinder, said end closure members having circumferential lugs adapted to engage in the slots of said tube whereby the lugs of said end closure members may be engaged in the slots of said tube and partially rotated to be detachably locked to the ends of said tube, and means connecting said end closure members whereby said end members are secured against relative movement one to the other.

7. In a cylinder construction for a fluid pressure motor, a cylinder consisting of a section of tube, said tube having circumferentially extending slots adjacent each end thereof, a pair of end closure members for said tube constituting the ends of the cylinder, said end closure members having circumferential lugs adapted to engage in the slots of said tube, whereby the lugs of said end closure members may be engaged in the slots of said tube and partially rotated to be detachably locked to the ends of said tube, said end members having projecting parts extending beyond the sides of said tube, and a member connecting said projecting parts, the slots in the respective ends of said tube opening in opposite directions, whereby said connecting member prevents partial rotation of said end closure members to prevent their removal from said tube.

8. In a cylinder construction for a fluid pressure motor, a cylinder consisting of a section of tube, said tube having circumferentially extending slots adjacent the ends thereof, a pair of end closure members for said tube constituting the ends of the cylinder, said end closure members having circumferential lugs adapted to engage in the slots of said tube, whereby the lugs of said end closure members may be engaged in the slots of said tube and partially rotated to be detachably locked to the ends of said tube, said closure members being positionable upon relatively opposite rotation, parts on said end members projecting beyond the sides of said tube, said parts having apertures therein, a guide member extending through said apertures, and a spacing sleeve on said guide member between said projecting parts of the end members to hold the latter against displacing movement.

9. In a packing construction for suction operated motors having a cylinder and piston relatively movable therein, a member fixed to the piston and extending lengthwise of the cylinder and through the end thereof, a packing member having a body extending transversely of the cylinder and a pair of collar portions one within the other, the outer collar portion having packing contact with the inner wall of the cylinder and the other collar portion having packing contact with said first named member, the latter extending through said packing member, inner and outer retaining plates at opposite sides of said packing member acting to hold the same in position, said collar portions extending away from the suction chamber of said cylinder, and cushioning means inserted between the collar portions and held therein by the outer retaining plate.

10. In a packing construction for suction operated motors having a cylinder and piston relatively movable therein, a member fixed to the piston and extending lengthwise of the cylinder, a packing member having a body extending transversely of the cylinder and a pair of collar portions one within the other, the outer collar portion having packing contact with the inner wall of the cylinder and the other collar portion having packing contact with said first named member, the latter extending through said packing member, and retaining plates at opposite sides of said packing member acting to hold the same in position, said collar portions extending away from the suction chamber of said cylinder, and said inner collar portion extending through the adjacent retaining plate in packing contact with said member.

HENRY HUEBER.
JOHN R. OISHEI.